United States Patent
Okimoto

[11] Patent Number: 5,926,990
[45] Date of Patent: Jul. 27, 1999

[54] BIRD DECOY MOVEMENT SYSTEM

[76] Inventor: Russell Okimoto, 16408 Harvest Ave., Norwalk, Calif. 90650

[21] Appl. No.: 08/676,927

[22] Filed: Jul. 8, 1996

[51] Int. Cl.$^6$ ..................................................... A01M 31/06
[52] U.S. Cl. ................................. 43/2; 446/304; 446/359
[58] Field of Search ............................... 43/2, 3; 40/414; 446/304, 353, 358, 359

[56] References Cited

U.S. PATENT DOCUMENTS

| | | | |
|---|---|---|---|
| 1,500,590 | 7/1924 | Marx | 446/304 |
| 1,738,604 | 12/1929 | Muller | 446/304 |
| 2,434,335 | 1/1948 | Signalness | 43/3 |
| 2,457,295 | 12/1948 | Woodhead | 43/3 |
| 2,747,314 | 5/1956 | McGregor | 43/3 |
| 2,849,823 | 9/1958 | Miller | 43/3 |
| 3,024,567 | 3/1962 | Nifke | 446/304 |
| 3,350,808 | 11/1967 | Mitchell | 43/3 |
| 3,736,688 | 6/1973 | Caccamo | 43/3 |
| 3,916,553 | 11/1975 | Lynch et al. | 43/3 |
| 3,939,591 | 2/1976 | Schwartztrauber | 43/3 |
| 4,375,337 | 3/1983 | Yerger | 43/3 |
| 4,535,560 | 8/1985 | O'Neil | 43/3 |
| 4,845,873 | 7/1989 | Hazlett | 43/3 |
| 4,896,448 | 1/1990 | Jackson | 43/3 |
| 4,965,953 | 10/1990 | McKinney | 43/2 |
| 5,036,614 | 8/1991 | Jackson | 43/3 |
| 5,168,649 | 12/1992 | Wright | 43/3 |
| 5,231,780 | 8/1993 | Gazalski | 43/3 |
| 5,233,780 | 8/1993 | Overholt | 43/2 |
| 5,274,942 | 1/1994 | Lanius | 43/3 |
| 5,289,654 | 3/1994 | Denny et al. | 43/2 |
| 5,316,516 | 5/1994 | Saitoh | 446/353 |
| 5,375,363 | 12/1994 | Higdon | 43/3 |
| 5,392,554 | 2/1995 | Farstad et al. | 43/3 |
| 5,410,829 | 5/1995 | Schwab et al. | 40/414 |
| 5,459,958 | 10/1995 | Reinke | 43/2 |
| 5,636,466 | 6/1997 | Davis | 43/3 |
| 5,775,022 | 7/1998 | Sumrall et al. | 43/3 |
| 5,809,683 | 9/1998 | Solomon | 43/3 |

FOREIGN PATENT DOCUMENTS

| | | | |
|---|---|---|---|
| 478235 | 11/1951 | Canada | 43/3 |
| 263377 | 8/1913 | Germany | 446/304 |

Primary Examiner—Michael J. Carone
Assistant Examiner—Darren Ark
Attorney, Agent, or Firm—Howard A. Kenyon

[57] ABSTRACT

A bird decoy movement system for simulating the movement of a bird is described. Some bird decoys are manufactured with legs that pivot at the lower part of the body. These decoys also have a prefabricated opening on the bottom of the body behind the pivotal legs. The preferred embodiment of the present invention takes advantage of the existing design in that the motion device is mounted in the prefabricated opening. The rotary motion of an arm mounted on the motion device shaft imparts a linear motion to a rod mounted on the end of the arm. When the other end of the arm is attached to a fixed rod in a ground plane, the decoy pivots about the pivotal legs and simulated feeding. Other embodiments simulate movement of a shell type decoy and a full body decoy with fixed legs.

2 Claims, 3 Drawing Sheets

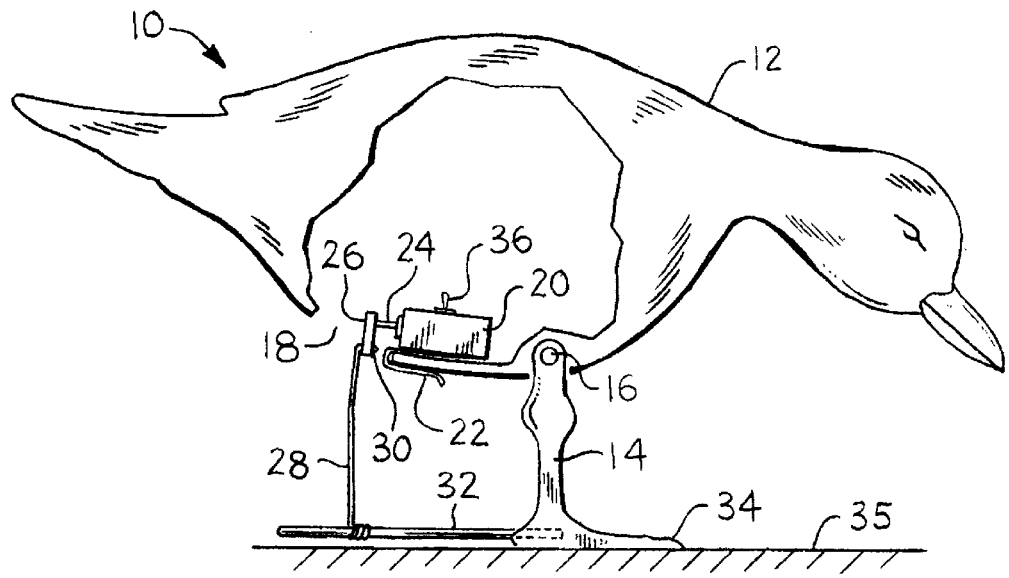
FIG. 1
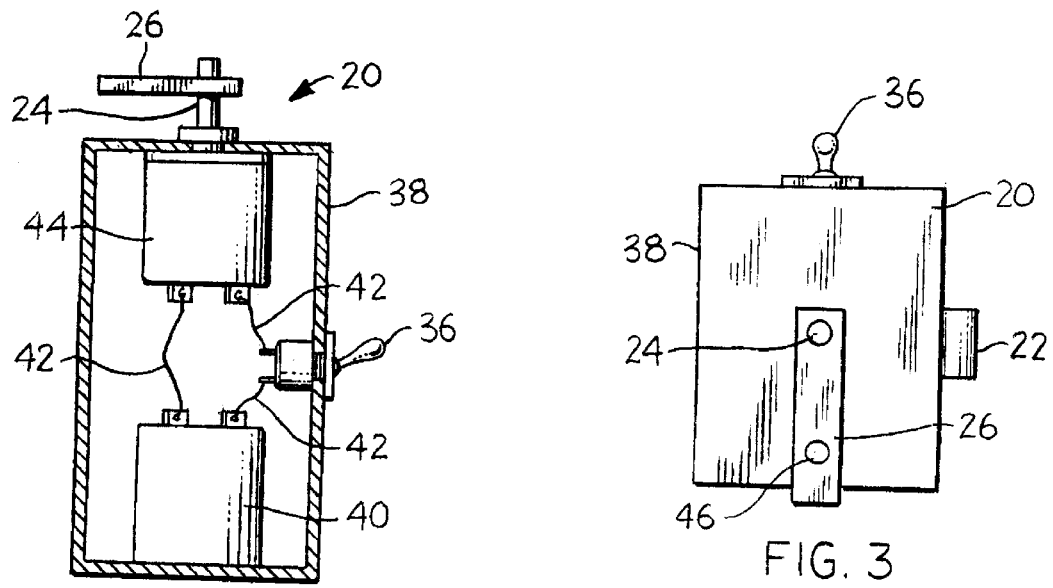
FIG. 2
FIG. 3

BIRD DECOY MOVEMENT SYSTEM

BACKGROUND OF THE INVENTION

1. Field of the Invention

This invention related to bird decoys on a land surface and more specifically motorized bird decoys simulating a feeding position.

2. Description of the Prior Art

Bird decoys are used by hunters to attract game birds. These decoys come in several configurations. Some float on the water naturally, others float on the water with an electric motor with a remote control, and others have feet to stand on solid terrain. Bird decoys also come in various sizes, from the small ducks to the large geese and turkeys.

There are many patents on bird decoys and some decoys are quite sophisticated and expensive with complete remote control device for water performance. Only the decoys adopted for land terrain are relevant to the present invention.

U.S. Pat. No. 5,036,614 to Jackson simulates the feeding action of a bird. Jackson must provide a pivoting mechanism, while the present invention utilizes the design of the bird decoy for pivoting action.

U.S. Pat. No. 3,916,553 to Lynch et al utilizes a mechanism to move the head and neck of the bird decoy for simulated feeding.

U.S. Pat. No. 5,289,684 to Denny et al is a radio controlled bird decoy that moves the head of the bird up and down and from side to side.

U.S. Pat. No. 5,233,780 to Overholt is a bird decoy that gives radio control auditory and visual signals, including movement.

U.S. Pat. No. 5,459,958 to Rieinke is a bird decoy which is string activated to provide mating movements.

U.S. Pat. No. 2,849,823 to Miller is a motor operated bird decoy that simulates shaking water off of stretching wings.

U.S. Pat. No. 4,896,448 to Jackson described a bird decoy having a mechanism to flap wings.

None of the above patents enjoy utilizing an existing bird decoy and adding movement means without modification to the decoy. What is needed is a simple, lowcost mechanism that can be added to an existing bird decoy to simulate natural movement of birds. Accordingly, a fuller understanding of the invention may be obtained by referring to the Summary of the Invention, and the Detailed Description of the Preferred Embodiment, in addition to the scope of the invention defined by he Claims taken in conjunction with the accompanying drawings.

SUMMARY OF THE INVENTION

It is the object of the present invention to provide a movable bird decoy.

It is another object of the present invention to use an existing decoy design to utilize a motion device.

It is still another object of the present invention to provide an electric motor mechanism for the motion device.

Briefly, in accordance with the present invention, there is provided, in one embodiment an existing decoy design that has legs and feet which allows the bird decoy to pivot where the legs attach to the bird decoy body. A prefabricated opening aft of the legs allows an electric mechanism to be attached to the body. The electric mechanism provides a rotary motion arm which is converted into linear motion by a rod attached to the end of the arm. The other end of the rod is fixed to a ground plane and therefore the bird decoy will pivot about the attachment of the legs to the body when the electric mechanism is turned on. The electric mechanism is run by either a battery or a rechargeable battery pack.

Other embodiments utilize existing designs with minor changes and use the same electric mechanism as above to provide bird decoy movement.

The novel features which are believed to be characteristics of the invention, both as its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only, and are not intended as a definition of the limits of the invention.

DESCRIPTION OF THE DRAWINGS

In the drawings, which illustrates the best mode presently contemplated for carrying out the present invention:

FIG. 1 is a side view of a bird decoy with the interior cut away showing the decoy motion device.

FIG. 2 is an expanded view of the bird decoy motion device showing the side of the housing cut away.

FIG. 3 is a top view of the bird decoy motion device.

Figure 4:
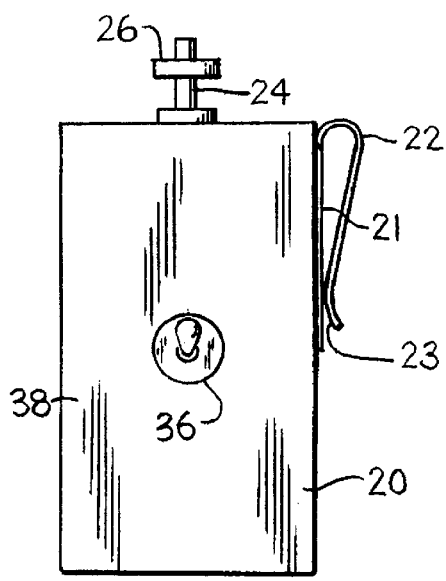
FIG. 4 is a side view of the bird decoy motion device showing the holding clip.

These and other objects, features and advantages of the present invention will become more readily apparent upon detailed consideration of the following Description of the Preferred Embodiment with reference to the accompanying Drawings.

DESCRIPTION OF THE PREFERRED EMBODIMENT

Turning now to FIG. 1 there is seen a bird decoy 10 having a body 12 and two legs 14. The legs 14 are detachable and pivot around axis 16. The body 12 has a prefabricated opening 18. A decoy motion device 20 is shown fastened to the inside of body 12 by clip 22. The decoy motion device 20 has an output shaft 24 and an output shaft arm 26. The output shaft arm 26 has a hole 46 in one end (shown in FIG. 3) to accommodate rod 28. The end of rod 28, designated 30, is bent slightly to keep the end 30 from falling out. Rod 28 is connected to fixed rod 32 that is attached to a foot 34 sifting on a hard surface 35. The decoy motion device 20 has a switch 36 to turn the decoy motion device 20 on or off. When the switch 36 is turned on, arm 26 rotates which imparts a linear motion to rod 28. Since rod 28 is secured to fixed rod 32, the linear motion causes the bird decoy 10 to pivot in a vertical plane around axis 16 and the bird decoy will move from an upright position to a feeding position.

Turning now to FIG. 2 there is seen the decoy motion device 20 with housing 38 partially removed to show the internal parts. A battery 40 is connected by wiring 42 to a D.C. electric motor 44 having reduction gears (not shown). A switch 36 turns the motor 44 on or off. The motor has an output shaft 24 and an output shaft arm 26. The output shaft has a hole 46 in one end (shown in FIG. 3). FIG. 2 has a battery access panel (not shown) in the bottom of housing 38.

FIG. 3 is a top view of the decoy motion device 20 showing the hole 46 in the output shaft arm 26. The clip 22 is also seen in this view.

FIG. 4 is a side view showing clip 22, output shaft 24, output shaft arm 26, housing 38 and switch 36. The clip 22 is substantially U-shaped and through frictional engagement between a portion of body 12 and opposing inner surfaces 21 and 23 of clip 22, the clip 22 secures the motor housing 38 to the inside of the body 12 by sliding the portion of the body 12 between the opposing inner surfaces 21 and 23 of the clip 22 so that a portion of the body 12 is engaged therebetween.

While the decoy motion device 20 is shown with a battery 40, a rechargeable battery pack (not shown) could be used to provide additional time of movement. It is estimated that a nine volt battery can activate the decoy motion device for at least 16 hours. The bird decoy 10 shown in FIG. 1 may be purchased through bird decoy catalogs under the trade name "Carry-Lite Deluxe which is incorporated by reference".

Figure 5:
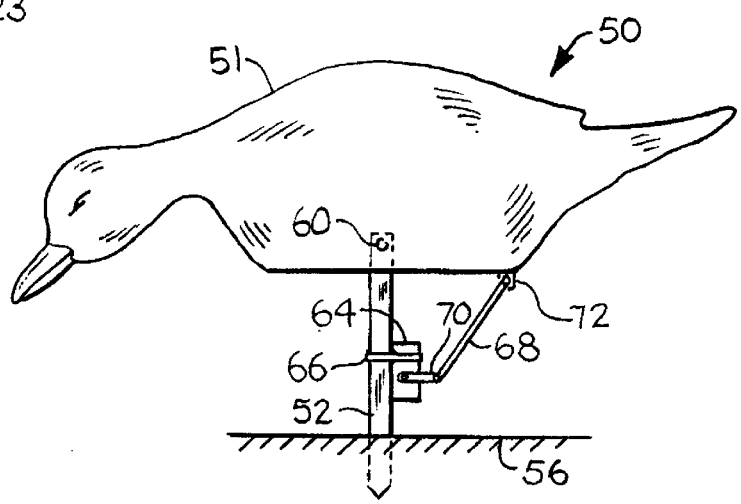
FIG. 5 shows an embodiment for pivotal movement of a shell type bird decoy.
Figure 6:
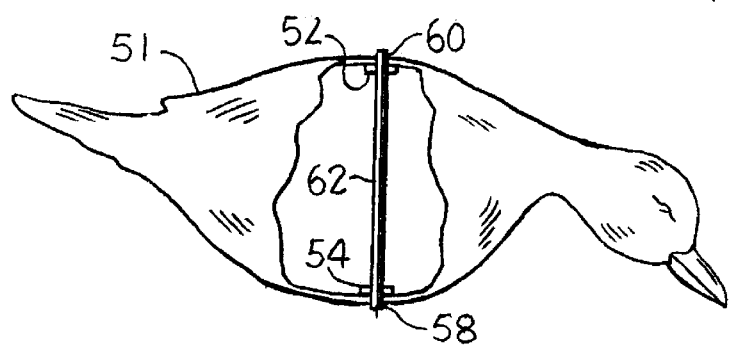
FIG. 6 is a cut away top view of the shell type bird decoy showing the pivoting mechanism inside the bird decoy.

Turning now to FIG. 5, there is shown a shell type bird decoy 50 having a body 51 which is essentially the upper half of a full bird decoy. This decoy has two stakes 52 and 54, as seen in FIG. 6, driven into the earth 56. Stakes 52 and 54 have a hole 58 in the top of the stakes. A hole 60 the same size and in line with hole 58 is formed in each side of the bird decoy body 51. A dowel 62 is inserted in the holes 58 and 60 such that the dowel will turn in the holes 60. The decoy motion device 64, which is identical to the decoy motion device 20, as shown in FIGS. 2, 3 and 4, is attached to stake 52 by a clamp 66. A rod 68 is attached to the output shaft arm 70 on one end and to a fitting 72 attached to the bird decoy body 51 on the other end. When the switch to the decoy motion device 64 is turned on, output shaft 70 provides rotary motion which in turn gives linear motion to rod 68. As output shaft arm 70 rotates, bird decoy 50 will provide pivotal action in a vertical plane and the bird decoy will move from an upright position to a feeding position.

Figure 7:
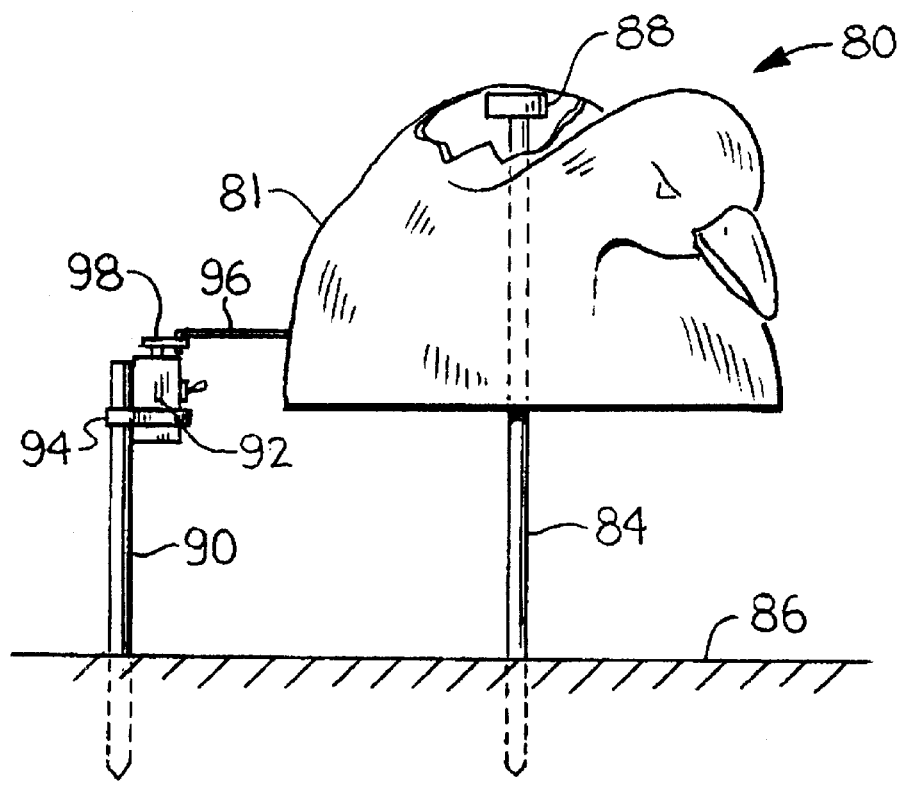
FIG. 7 is a front view of the shell type bird decoy with the decoy motion device connected to provide horizontal movement.
Figure 8:
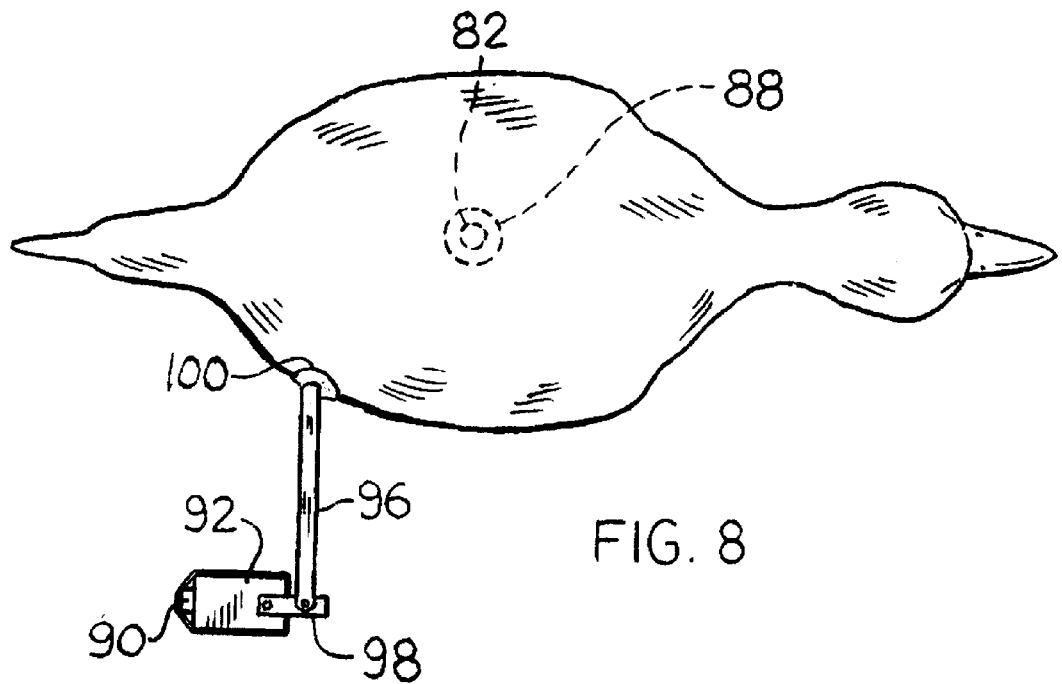
FIG. 8 is a top view of the shell type bird decoy with the decoy motion device connected.

FIG. 7 is also a shell type bird decoy 80 having a body 81 which again is the upper half of a full body bird decoy. This configuration is designed to go from side to side. A hole 82 is formed in the center of body 81 and round rod 84 is placed through the hole 82 into earth 86. A collar 88 is clamped to rod 84 near the top to keep the body 81 suspended in place. A stake 90 is driven into earth 86 and a decoy motion device 92 is strapped to stake 90 by clamp 94. The decoy motion device 92 is identical to the decoy motion device 20 shown in FIGS. 2, 3 and 4. A rod 96 is attached to the output shaft arm 98 on one end and to a fitting 100 on the other end. When the switch to the decoy motion device 92 is turned on, output shaft 98 provides rotary motion which in turn gives linear motion to rod 96. As output shaft arm 98 rotates, bird decoy 80 will move in a horizontal plane to simulate a feeding action.

Thus, it is apparent that there has been provided in accordance with the invention a Bid Decoy Movement System that fully satisfies the objects, aims, and advantages set forth above. While the invention has been described in conjunction with specific embodiments thereof, it is evident that many alternatives, modifications, and variations will be apparent to those skilled in the arm in light of the aforegoing description. According, it is intended to embrace all such alternatives, modifications and variations that fall within the spirit and scope of the appended Claims.

What is claimed is:

1. A bird decoy movement system comprising:

a body having a hollow interior, said body having two pivotal legs attached to the bottom of said body, said body having a prefabricated opening on the bottom of said body behind said pivotal legs, said pivotal legs having feet which are placed on a surface supporting said body in an upright position;

a D.C. electric motor having a housing and reduction gears to provide a rotary motion to an arm attached to a shaft on said D.C. electric motor, said D.C. electric motor attached to the inside of said hollow interior;

a rod attached to said arm on one end and attached to a fixed rod on the other end, said fixed rod being parallel to said surface, said fixed rod being affixed to one of said feet;

a 9-volt battery or a rechargeable battery pack powering said D.C. electric motor, said D.C. electric motor having a speed that is constant whereby a feeding movement of said bird decoy is constant and continuous until said D.C. electric motor is turned off or said 9-volt battery or said rechargeable battery pack looses sufficient power to run said D.C. motor;

an on or off switch in a waterproof housing, said housing having a clip integral with said housing, said clip being used to attach said housing in the prefabricated opening of said body, said clip being substantially U-shaped having opposing inner surfaces and through frictional engagement between a portion of said body and said opposing inner surfaces of said clip, said clip securing said motor housing to the inside of said body by sliding the portion of said body between said opposing inner surfaces of said clip so that the portion of said body is engaged therebetween, said on or off switch when turned to the on position, a pivoting action will be imparted to said body pivoting about said two legs, pivotally to said body, said pivoting action moving said body in a vertical plane between an upright position and a feeding position of said decoy.

2. A method of providing a bird decoy movement comprising:

providing a body having a hollow interior, said body having two pivotal legs attached to the bottom of said body, said body having a prefabricated opening on said body behind said pivotal legs, said pivotal legs having feet which are placed on a surface supporting said body in an upright position;

attaching a D.C. electric motor having a housing and having reduction gears in the opening of said body to provide rotary motion to an arm attached to a shaft on said D.C. electric motor:

attaching a rod to said arm on one end and attaching said rod to a fixed rod on the other end, said fixed rod being parallel to said surface, said fixed rod further attached to one of said feet;

providing a 9-volt battery or a rechargeable battery pack to power said D,C. electric motor whereby said D.C.

electric motor having a speed that is constant such that a feeding movement of said bird decoy is constant and continuous until said D.C. electric motor is turned off or said 9-volt battery or said rechargeable battery pack looses sufficient power to run said D.C. electric motor;

providing an on or off switch in a waterproof housing, said housing having a clip integral with said housing, said clip being used to attach said housing in the prefabricated opening of said body, said clip being substantially U-shaped having opposing inner surfaces and through frictional engagement between a portion of said body and said opposing inner surfaces of said clip, said clip securing said motor housing to the inside of said body by sliding the portion of said body between said opposing inner surfaces of said clip so that the portion of said body is engaged therebetween, said on or off switch when turned to the on position, a pivoting action will be imparted to said body pivoting about said two legs, pivotally attached to said body, said pivoting action moving said body in a vertical plane between an upright position and a feeding position of said bird decoy.

\* \* \* \* \*